United States Patent [19]

Minka

[11] 4,170,125
[45] Oct. 9, 1979

[54] TOOL FOR CRIMPING FERRULES ON CONDUITS

[76] Inventor: Peter Minka, 269 Mt. Vernon Ave., Rochester, N.Y. 14620

[21] Appl. No.: 949,896

[22] Filed: Oct. 10, 1978

[51] Int. Cl.² .................. B21D 9/00; B25B 27/00; B21D 9/07
[52] U.S. Cl. ........................... 72/410; 29/237; 29/268; 81/425 A; 81/426
[58] Field of Search ............ 72/410, 409; 29/237, 29/268, 508, 520; 81/425 R, 425 A, 426, 418

[56] References Cited

U.S. PATENT DOCUMENTS

| | | | |
|---|---|---|---|
| 1,678,313 | 7/1928 | Atkinson | 29/268 |
| 1,746,016 | 2/1930 | Shiffman | 29/268 |
| 2,108,742 | 2/1938 | Bickel | 29/508 |
| 2,439,501 | 4/1948 | Yelkin | 29/268 |
| 3,096,876 | 7/1963 | Scudieri | 29/508 |
| 3,175,281 | 3/1965 | Elfsten | 72/410 |
| 3,201,859 | 8/1965 | Stanley | 29/237 |
| 4,075,749 | 2/1978 | Hubeny | 29/268 |

Primary Examiner—Francis S. Husar
Assistant Examiner—Gene P. Crosby
Attorney, Agent, or Firm—Stonebraker, Shepard & Stephens

[57] ABSTRACT

A portable hand tool for crimping ferrules on flexible conduits such as are used for electrical wiring, for example. Two members pivotally connected to each other have handle portions for manipulation by the user, and jaw portions. One jaw portion has a fixture pivotally mounted on it, for receiving a ferrule which has been placed on but not yet crimped to the end of a conduit. The other jaw portion has laterally spaced arms which straddle the conduit and, as the jaws move toward each other, exert pressure on the usual nut which serves also as a crimping member, to force the internal crimping flange of the nut axially against the rear end of the ferrule to deform the metal of the ferrule and crimp it firmly onto the conduit.

7 Claims, 9 Drawing Figures

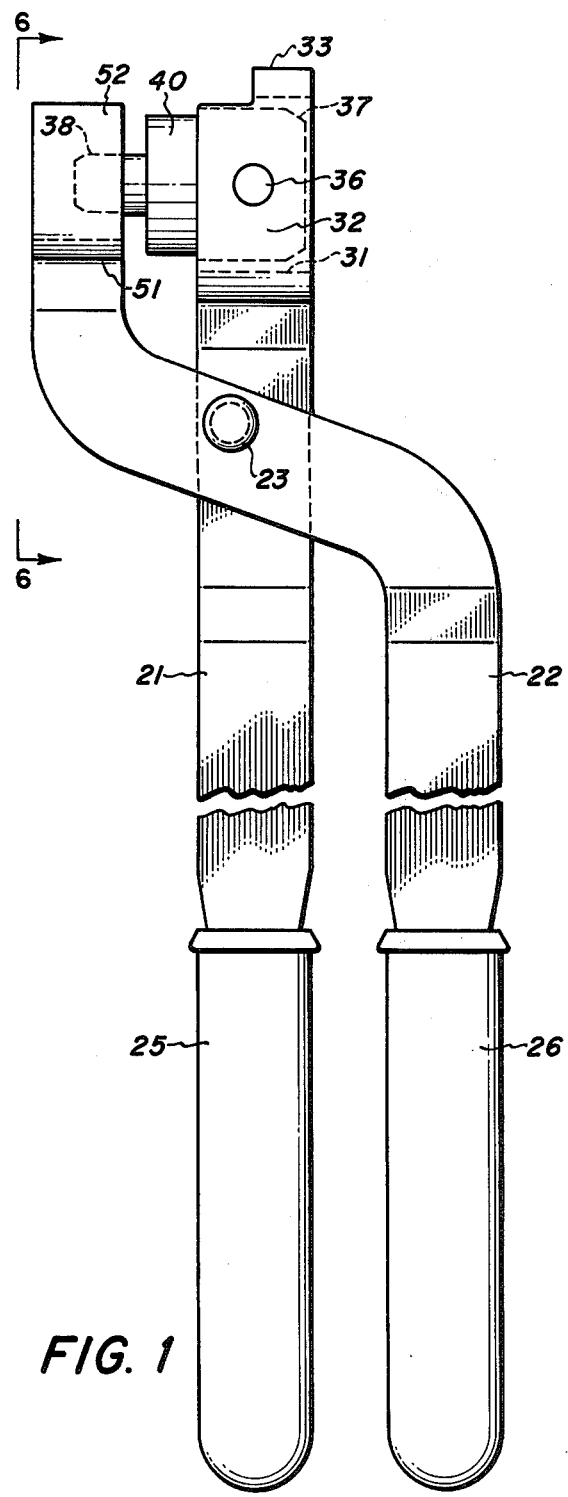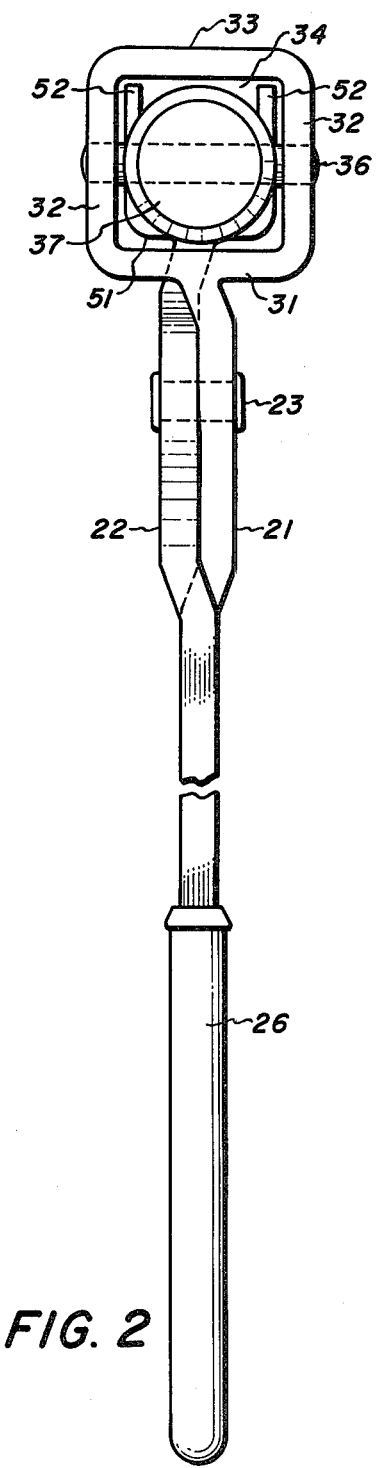
FIG. 1
FIG. 2

TOOL FOR CRIMPING FERRULES ON CONDUITS

This invention relates to a tool for crimping ferrules on the ends of conduits such as are used for certain types of electrical wiring, although they may be used also for other purposes, such as for conveying fluids, whether liquids or gasses.

In certain known types of flexible conduits, made for example of plastic coated spiral wound steel, a ferrule of metal is fastened firmly to the end of the conduit by a crimping process, and then a retaining nut, previously placed around the conduit before the ferrule is placed thereon, engages the ferrule and is screwed onto a threaded fitting for connection to a junction box or other appropriate part, to hold the end of the conduit against such part. In the past practice, the crimping of the ferrule has usually been done by placing the appropriate fitting in a vise, and placing the nut and ferrule on the end of the conduit and screwing the nut onto the fitting sufficiently to produce the crimp, using a wrench for this purpose. Then the nut must be unscrewed from the fitting, and the condut is taken to the point of installation. The vise is located on the job site, of course, but not necessarily very close to the actual location where the conduit is being installed.

Therefore, it frequently happens that a workman must take a piece of conduit to a particular place where it is to be installed, make sure that the length is correct or cut it to the correct length, and then take it some distance away to the location of the vise which holds the fitting used for crimping, to crimp the ferrule on the end of the conduit, after which the conduit is taken back to the exact point of installation and is installed. When many conduits are to be installed in one location, a great deal of time is lost in going back and forth repeatedly from the location where the conduits are being installed to the location of the vise, even if the vise is only a few feet away.

An object of the present invention is to provide a small hand-held crimping tool sufficiently light and small to be easily portable, and so designed that the workman can carry it as easily as he could carry a hammer or a wrench, and can have it with him at all times. Thus even when working in crimped or confined quarters, the workman can have the crimping tool right at hand, and as soon as he has tested the conduit for proper length at the place of installation, he can immediately place the nut on the conduit and the ferrule on the end of the conduit and crimp the ferrule with the hand tool, avoiding the necessity of walking even a few steps to a vise which holds a fitting to be used in crimping.

A further important object is the provision of a crimping device which will crimp by producing straight axial pressure on the nut, eliminating the time-consuming operations of screwing the nut onto a fitting to produce the crimp and then unscrewing the nut from the fitting so that the conduit may be taken to the point of installation.

Another object is the provision of such a crimping device so designed that it will crimp the ferrule evenly around the circumference of the ferrule, avoiding the possibility of a partial crimping on one side only, which produces a defective joint.

Still another object is the provision of a tool so designed that it can be manufactured easily and relatively cheaply, and that the necessary crimping pressure can be applied by modest exertion on the part of the workman.

BRIEF DESCRIPTION OF THE DRAWINGS

FIG. 1 is a side elevational view of a tool according to a preferred embodiment of the invention;

FIG. 2 is an edge view of the same;

DESCRIPTION OF THE PREFERRED EMBODIMENT

Figure 3:
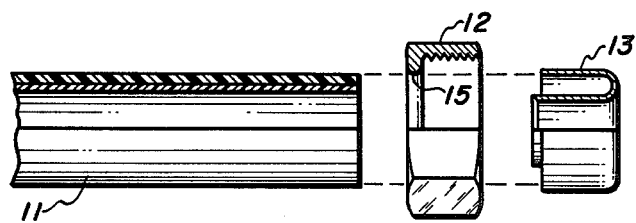
FIG. 3 is an exploded view partly in longitudinal section and partly in elevation, illustrating a piece of conduit, a nut, and a ferrule before they are brought together.
Figure 4:
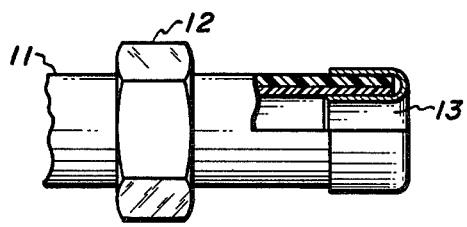
FIG. 4 is a view of the same parts shown in FIG. 3, with the nut placed on the conduit and the ferrule placed on the end of the conduit but not yet crimped.
Figure 5:
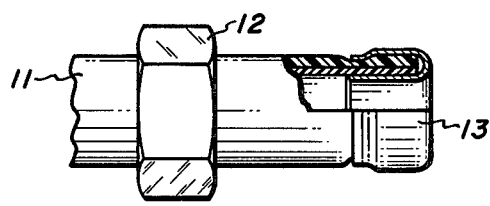
FIG. 5 is a similar view illustrating the ferrule after crimping has taken place.
Figure 6:
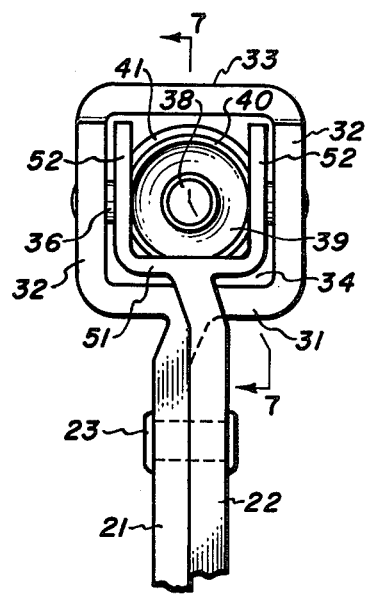
FIG. 6 is a fragmentary view of the jaw portion of the tool, looking at the opposite side from that shown in FIG. 2.
Figure 7:
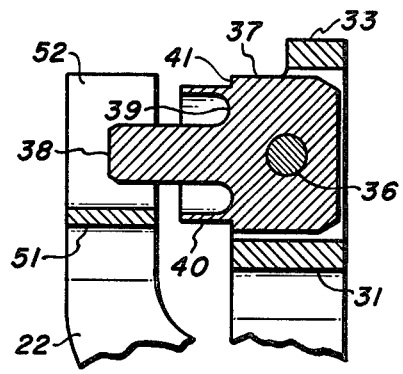
FIG. 7 is a section taken approximately on the line 7—7 of FIG. 6.

Referring first to FIGS. 3–5 in order to understand the parts with which the present tool is used, a section of flexible conduit is shown at 11. The internally threaded nut 12 fits closely around the exterior of the conduit 11, and the metal ferrule 13 is placed on the end of the conduit after the nut has been slipped onto the conduit as shown in FIG. 4. At its rear end, the nut 12 has an inwardly directed radial flange extending circumferentially around the periphery of the conduit 11 in close proximity thereto, the inner edge of this flange being rounded as illustrated in FIG. 3, so that when the nut is forcibly pressed axially against the rear end of the ferrule 13, the rounded flange 15 of the nut will crimp the rear end of the ferrule inwardly tightly against the material of the conduit 11, deforming it from the position shown in FIG. 4 to the position shown in FIG. 5. By this action the material of the conduit is tightly clamped between the inner and outer portions of the metallic ferrule, which thereby becomes firmly fastened to the end of the conduit.

This construction of the parts illustrated in FIGS. 3–5, together with the crimping action above described in connection therewith, are well known and form no part of the present invention. The conduit may be, for example, what is known in the industry as a "Sealtite" conduit, with "Appleton" connectors (nut and ferrule) although the present invention is applicable to other makes or brands of conduits and connectors which operate in approximately the same way.

Referring now to FIGS. 1, 2, and 6–9, the tool of the present invention comprises two elongated members 21 and 22 pivoted to each other at 23. When viewed as in FIGS. 1 and 2, the lower portions of the members 21 and 22, below the pivot 23, constitute elongated handle portions, and the upper portions, above the pivot 23, constitute the jaw portions which perform the work on the nut and ferrule to provide the crimping action, when manual pressure is applied to the lower or handle portions. Convenient grip portions 25 and 26 may be applied to the handle portions of the members 21 and 22, respectively, for comfortably fitting the hand of the user.

Above the pivot 23 one of the two main members, such as the member 21, is expanded laterally to form a hollow or box-like structure with a bottom wall 31, sidewalls 32, and top wall 33, enclosing a central opening or space 34, as illustrated especially in FIG. 2. In the particular form here shown, this structure is of approximately square outline, although it could be circular or of any other desired shape, so long as it had sufficient open space in the center.

A pivot 36 extends across this structure, from one side wall 32 to the other, the axis of this pivot 36 being parallel to the axis of the pivot 23 which pivots the two main arms to each other. Pivotally mounted on this pivot 36, for limited swinging movement thereon, is a fixture 37 having the shape best shown in FIG. 7.

Figure 8:
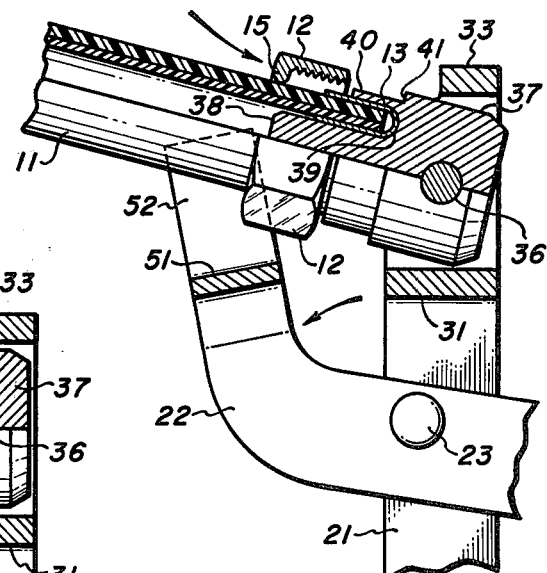
FIG. 8 is a view illustrating the jaws of the tool in open position and the assembled conduit, nut, and ferrule being loaded into the jaws of the tool.
Figure 9:
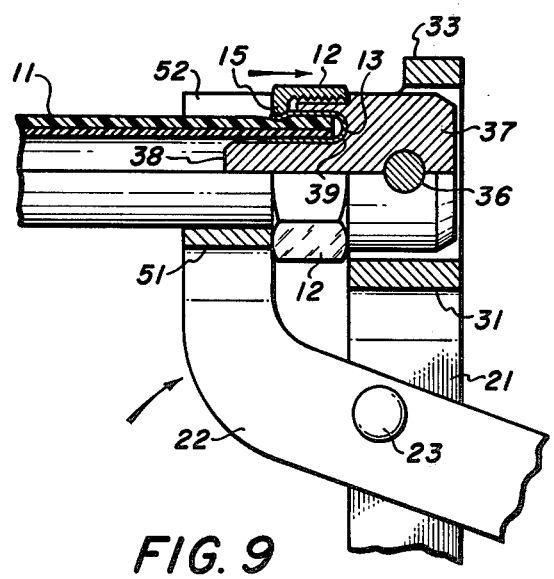
FIG. 9 is a view of the same parts at the completion of the crimping operation.

This fixture 37 has a central plug-like portion or extension 38 of cylindrical shape and of proper size to fit snugly within the ferrule as indicated in FIGS. 8 and 9. Around this plug-like portion 38 is an annular recess 39 shaped to receive and fit closely against the curved forward end of the ferrule, as illustrated. A flange 40 on the fixture 37 snugly surrounds the outer wall of the ferrule but terminates short of the rear end of the ferrule, so as not to interfere with the crimping action of the nut on the rear end of the ferrule. The outer surface of this flange 40 is of slightly smaller diameter than the internal threads on the nut, as seen in FIG. 9, so the threads do not make appreciable contact with the fixture 37. A shoulder 41 on the fixture forms a stop for the forward end of the nut, limiting the extent to which the nut can move relative to the ferrule during the crimping operation.

The other arm 22 of the tool has its upper end formed as a fork or yoke with a bottom wall 51 and two sidewalls 52 (FIG. 6) spaced from each other just far enough to admit the diameter of the conduit between them. These arms 52 of the yoke will engage the rear face of the nut when the end of the conduit, with the nut and ferrule mounted thereon, is placed in proper position in the tool, and then the clamping action of the tool, when the handles are brought together to cause the jaw portion to tend to close, will press the yoke arms 52 against the rear face of the nut, forcing the nut against the ferrule and causing the inwardly extending flange 15 of the nut to crimp the ferrule in the desired manner.

If the manipulating arms of the tool are spread apart or swung from the position shown in FIG. 1 to an open position, this will open the jaw end of the tool from the closed position shown in FIG. 9 to the open position shown in FIG. 8. In this open position, the end of the conduit with the ferrule loosely applied thereto, is placed on the plug portion 38 of the fixture 37, in the loading position shown in FIG. 8. At this time, the nut is loose on the conduit, fairly close to the ferrule, as illustrated. This assembly of conduit end and ferrule and nut is swung down, counterclockwise from the position shown in FIG. 8 toward the position shown in FIG. 9, and the handle portions of the tool are then brought together by manual force applied by the person using the tool, so that the upper end or jaw end of the member 22 swings clockwise on its pivot 23 relative to the other member 21, engaging the rear face of the nut and forcing the nut rightwardly to crimp the ferrule in the desired manner. When the crimping operation has proceeded far enough, the forward face of the nut comes in contact with the shoulder 41 on the fixture 37, as illustrated in FIG. 9, and the nut can move no further. The operator feels this contact, while performing the operation, and thus is made aware, through the sense of feeling, that the motion has been completed and the crimping action is finished.

The tool may then be opened up by swinging the members 21 and 22 on the pivot 23, to the open position, whereupon the end of the conduit may be removed from the tool, and is now ready to have the nuts screwed onto a nipple or junction box or any other part to which it is to be attached.

It is to be noted that the mounting of the fixture 37 on a pivot, rather than mounting it rigidly on an arm of the tool, is advantageous for two reasons. First, it enables easier loading of the conduit into the tool and removal of the completely crimped conduit from the tool, since the fixture 37 can pivot or swing upwardly to a position where the conduit and the nut thereon has minimum interference with the pressure yoke 52. Second, the pivoting is advantageous because it enables the pressure of the yoke 52 to be applied to the nut evenly in a line along the axis of the conduit and the nut, with the line of pressure properly centered. It avoids eccentric loading or offset loading which would be likely to occur if the fixture were not pivoted, since in that case the pressure would be applied at first near the bottom of the rear face of the nut, with a tendency to skew or twist the axis of the nut relative to the axis of the conduit, thereby producing more crimping on one side of the ferrule than on the opposite side, and resulting in a faulty joint.

It will be noted from FIG. 2 that where the two arms 21 and 22 of the tool cross each other in the vicinity of the pivot 23, they are arranged side by side, but both above and below the pivot the arms are offset laterally so as to be in the same plane with each other, for smoothly aligned operation of the jaw portion and for easy and convenient grasping of the handle portion.

A conduit made of plastic material has been mentioned as an example. The invention is equally useful in crimping ferrules on conduits of the ferrule metallic type.

What is claimed is:

1. A portable hand tool for crimping a ferrule on an end of a flexible conduit, said tool comprising two members pivotally connected to each other to provide two handle portions adapted for swinging movement toward and away from each other upon manipulation by the hands of a user and two jaw portions movable toward and away from each other in response to manipulation of said handle portions, a ferrule receiving fixture mounted on one of said jaw portions, and a yoke on the other of said jaw portions, said yoke having two arms spaced laterally from each other through a sufficient distance to receive between them a conduit on which a ferrule is to be crimped and to engage with a crimping member surrounding such conduit and to exert axial pressure on said crimping member when said jaw portions are moved toward each other during manipulation of said handle portions.

2. The invention defined in claim 1, wherein said crimping member surrounding said conduit is in the form of a nut having an inwardly extending flange adapted to crimp a ferrule when forced axially against the ferrule.

3. The invention defined in claim 1, wherein said fixture is pivoted to the jaw portion on which it is mounted, for swinging movement relative thereto.

4. The invention defined in claim 1, wherein said fixture includes a plug portion fitting snugly within a ferrule applied to the fixture, and a seating portion against which an end of the ferrule may press to limit axial movement of the ferrule during a crimping operation.

5. The invention defined in claim 4, wherein said fixture further includes a cylindrical flange for closely surrounding an outer wall of a ferrule seated on said fixture through only a portion of the length of such outer wall, and a shoulder forming an abutment limiting the extent to which a crimping member can move axially relative to the ferrule during a crimping operation.

6. The invention defined in claim 5, wherein said fixture is pivoted to the jaw portion on which it is mounted, for limited swinging movement relative thereto.

7. The invention defined in claim 6, wherein said fixture is pivoted to swing on a pivotal axis substantially parallel to the pivotal axis on which said two members swing relative to each other.

* * * * *